(12) United States Patent
Shameli et al.

(10) Patent No.: US 9,379,785 B2
(45) Date of Patent: Jun. 28, 2016

(54) NEAR FIELD RFID SYSTEM WITH MULTIPLE READER COILS

(75) Inventors: Amin Shameli, Irvine, CA (US); Aminghasem Safarian, Irvine, CA (US); Ahmadreza (Reza) Rofougaran, Newport Castle, CA (US); Maryam Rofougaran, Rancho Palos Verdes, CA (US); Franco De Flaviis, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1155 days.

(21) Appl. No.: 12/983,454

(22) Filed: Jan. 3, 2011

(65) Prior Publication Data

US 2011/0111695 A1    May 12, 2011

Related U.S. Application Data

(63) Continuation of application No. 11/713,285, filed on Mar. 2, 2007, now abandoned, which is a continuation-in-part of application No. 11/340,243, filed on Jan. 26, 2006, now Pat. No. 7,623,606, and a continuation-in-part of application No. 11/394,808, filed on Mar. 31, 2006, now Pat. No. 7,595,732, and a continuation-in-part of application No. 11/529,055, filed on Sep. 28, 2006, now Pat. No. 7,751,790.

(60) Provisional application No. 60/880,592, filed on Jan. 16, 2007.

(51) Int. Cl.
*H04B 1/38* (2015.01)
*H04L 5/16* (2006.01)
*H04B 5/02* (2006.01)
*H04L 25/49* (2006.01)
*H04L 27/02* (2006.01)
*H04B 5/00* (2006.01)

(52) U.S. Cl.
CPC .............. *H04B 5/02* (2013.01); *H04L 25/4904* (2013.01); *H04L 27/02* (2013.01); *H04B 5/0031* (2013.01); *H04B 5/0037* (2013.01); *H04B 5/0062* (2013.01); *H04B 5/0087* (2013.01)

(58) Field of Classification Search
CPC ..... H04L 25/0266; H04L 7/033; H04L 25/06; H04L 5/023; H04L 1/243; H04L 1/0001; H04L 1/0009; H04L 1/1854; H04M 11/06; G01R 31/31716
USPC ................. 375/219–223, 259–285, 295–352; 340/10.2, 572.5, 572.7, 645
See application file for complete search history.

(56) References Cited

U.S. PATENT DOCUMENTS 5,608,417 A * 3/1997 de Vall ........................... 343/895
6,282,342 B1 * 8/2001 Berkey et al. ................... 385/43
(Continued)

*Primary Examiner* — James M Perez
(74) *Attorney, Agent, or Firm* — Garlick & Markison; Edward Marshall

(57) ABSTRACT

A near field RFID system includes an RFID reader and an RFID tag. The RFID reader includes a transmit path and a receive path, wherein the transmit path includes: an encoding section coupled to convert data into encoded data; a digital to analog conversion module coupled to convert the encoded data into an analog encoded signal; a power amplifier coupled to amplify the analog encoded signal; and a plurality of coils coupled to generate a plurality of electromagnetic fields from the analog encoded signal. The RFID tag that includes: a coil coupled to generate a current and a recovered signal from at least one of the plurality of electromagnetic fields; a power recovery circuit coupled to generate a voltage from the current; and a data processing section coupled to process the recovered signal, wherein the data processing section is powered via the voltage.

20 Claims, 7 Drawing Sheets

(56) References Cited

U.S. PATENT DOCUMENTS

| | | | |
|---|---|---|---|
| 7,817,037 B2* | 10/2010 | Brederlow et al. | 340/572.1 |
| 2005/0078665 A1* | 4/2005 | Yu et al. | 370/380 |
| 2005/0084003 A1* | 4/2005 | Duron et al. | 375/221 |
| 2005/0125093 A1* | 6/2005 | Kikuchi et al. | 700/213 |
| 2006/0015503 A1* | 1/2006 | Simons et al. | 707/10 |
| 2006/0033609 A1* | 2/2006 | Bridgelall | 340/10.42 |
| 2007/0001813 A1* | 1/2007 | Maguire et al. | 340/10.2 |
| 2007/0026825 A1* | 2/2007 | Wilson | 455/130 |
| 2007/0164868 A1* | 7/2007 | Deavours et al. | 340/572.7 |
| 2007/0257800 A1* | 11/2007 | Yang et al. | 340/572.7 |

* cited by examiner

NEAR FIELD RFID SYSTEM WITH MULTIPLE READER COILS

CROSS REFERENCE TO RELATED PATENTS/PATENT APPLICATIONS

Continuation priority claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 11/713,285, entitled "Near field RFID system with multiple reader coils," filed Mar. 2, 2007, now abandoned, which claims priority pursuant to 35 U.S.C. §119(e) to the following U.S. Provisional Patent Application which is hereby incorporated herein by reference in its entirety and made part of the present U.S. Utility Patent Application for all purposes:
   a. U.S. Provisional Patent Application Ser. No. 60/880,592, entitled "Near field RFID system with multiple reader coils," filed Jan. 16, 2007, now expired.

Continuation-in-part (CIP) priority claims, 35 U.S.C. §120

U.S. Utility patent application Ser. No. 11/713,285 also claims priority pursuant to 35 U.S.C. §120, as a continuation-in-part (CIP), to each of the following three (3) U.S. Utility Patent Applications which are hereby incorporated herein by reference in their entirety and made part of the present U.S. Utility Patent Application for all purposes:

1. U.S. Utility patent application Ser. No. 11/340,243, entitled "Decoding of bi-phase encoded data," filed Jan. 26, 2006, now U.S. Pat. No. 7,623,606, issued on Nov. 24, 2009.

2. U.S. Utility patent application Ser. No. 11/394,808, entitled "Power generating circuit," filed Mar. 31. 2006, now U.S. Pat. No. 7,595,732, issued on Sep. 29, 2009.

3. U.S. Utility patent application Ser. No. 11/529,055, entitled "Hybrid on-chip-off-chip transformer," filed Sep. 28, 2006, now U.S. Pat. No. 7,751,790, issued on Jul. 6, 2010.

BACKGROUND OF THE INVENTION

1. Technical Field of the Invention

This invention relates generally to communication systems and more particularly to a transformer that may be used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many wireless communication devices, the transmitter and/or receiver is coupled to antenna, or antennas, by one or more transformers. Such a transformer typically includes a single-ended winding that is coupled to the antenna and a differential winding that is coupled to a low noise amplifier of a receiver section and/or to a power amplifier of a transmitter section. The transformer may be implemented in a variety of ways. For instance, the transformer may be implemented on-chip with the receiver and/or transmitter section. While an on-chip transformer provides the convenience of not requiring an external transformer, the on-chip transformer's power capabilities are limited due to its size.

Another known implementation of a transformer is a marginal type transformer that is fabricated on a printed circuit board (PCB). A marginal type transformer includes two parallel traces that each is approximately one-quarter wavelength in length. As such, a margin type transformer consumes a significant amount of PCB real estate, but does provide significant power in comparison to the on-chip transformer. As with any transformer, impedance matching between the antenna and receiver or transmitter section is an important design criterion.

In RFID systems, the cost and the size of the tag and the ability to provide secure communication between the reader and the tag are critical design challenges. The reduction of the cost and the size of the tag in existing RFID systems, however are primarily limited to the design and implementation of passive components, i.e. bulky antenna or coupling coil that can not be integrated on-chip. In addition, the use of complex data encryption algorithms, for security, requires a lot of power consumption and therefore, is not practical for extremely low-power passive tags.

Therefore, a need exists for a size, cost, and/or performance efficient RFID system.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
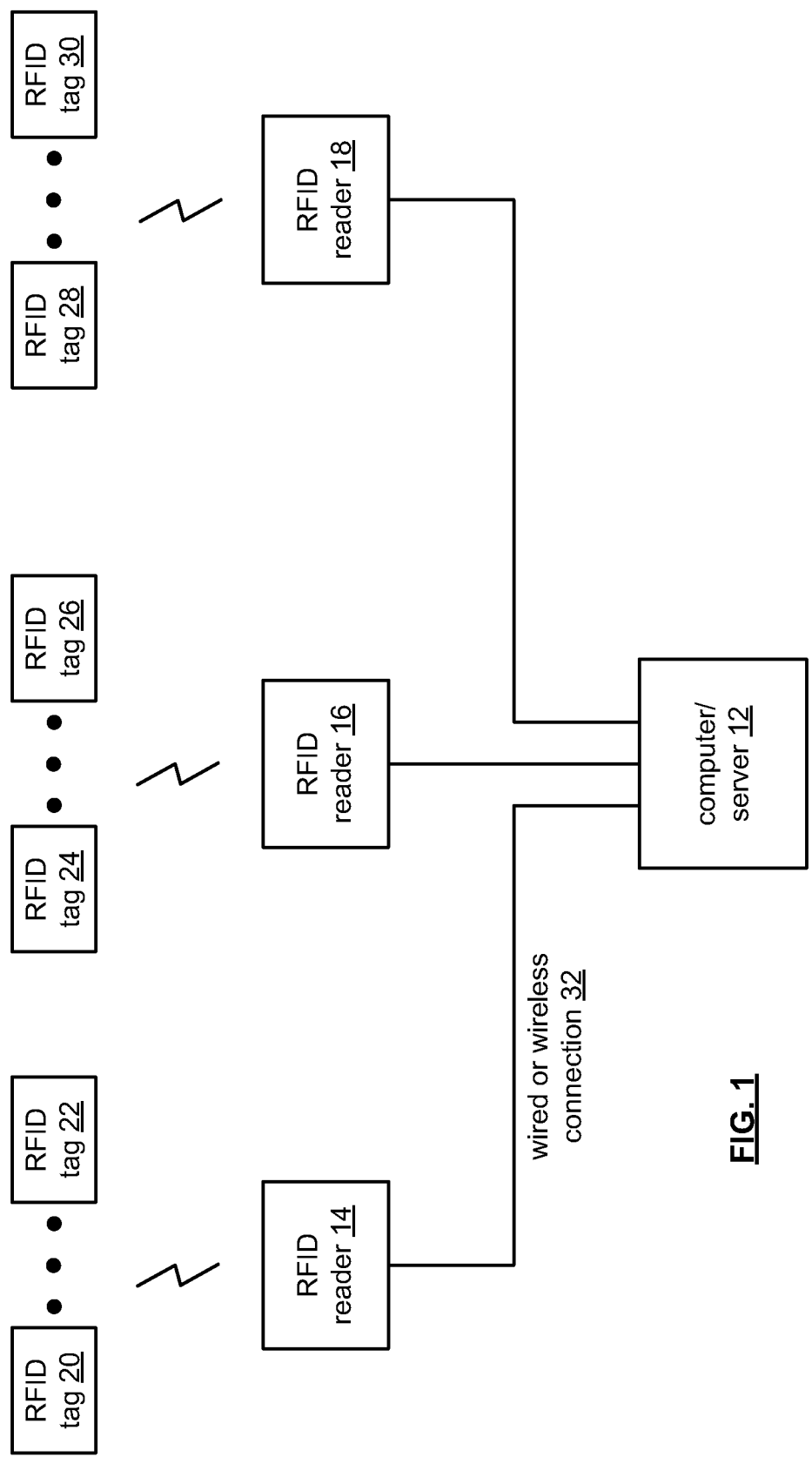
FIG. 1 is a schematic block diagram of an embodiment of a radio frequency identification (RFID) system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26, and RFID reader 18 has RFID tags 28 and 30 within its coverage area. The RF communication scheme between the RFID readers 14-18 and RFID tags 20-30 may be a backscattering technique whereby the RFID readers 14-18 provide energy to the RFID tags via an RF signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage.

Figure 2:
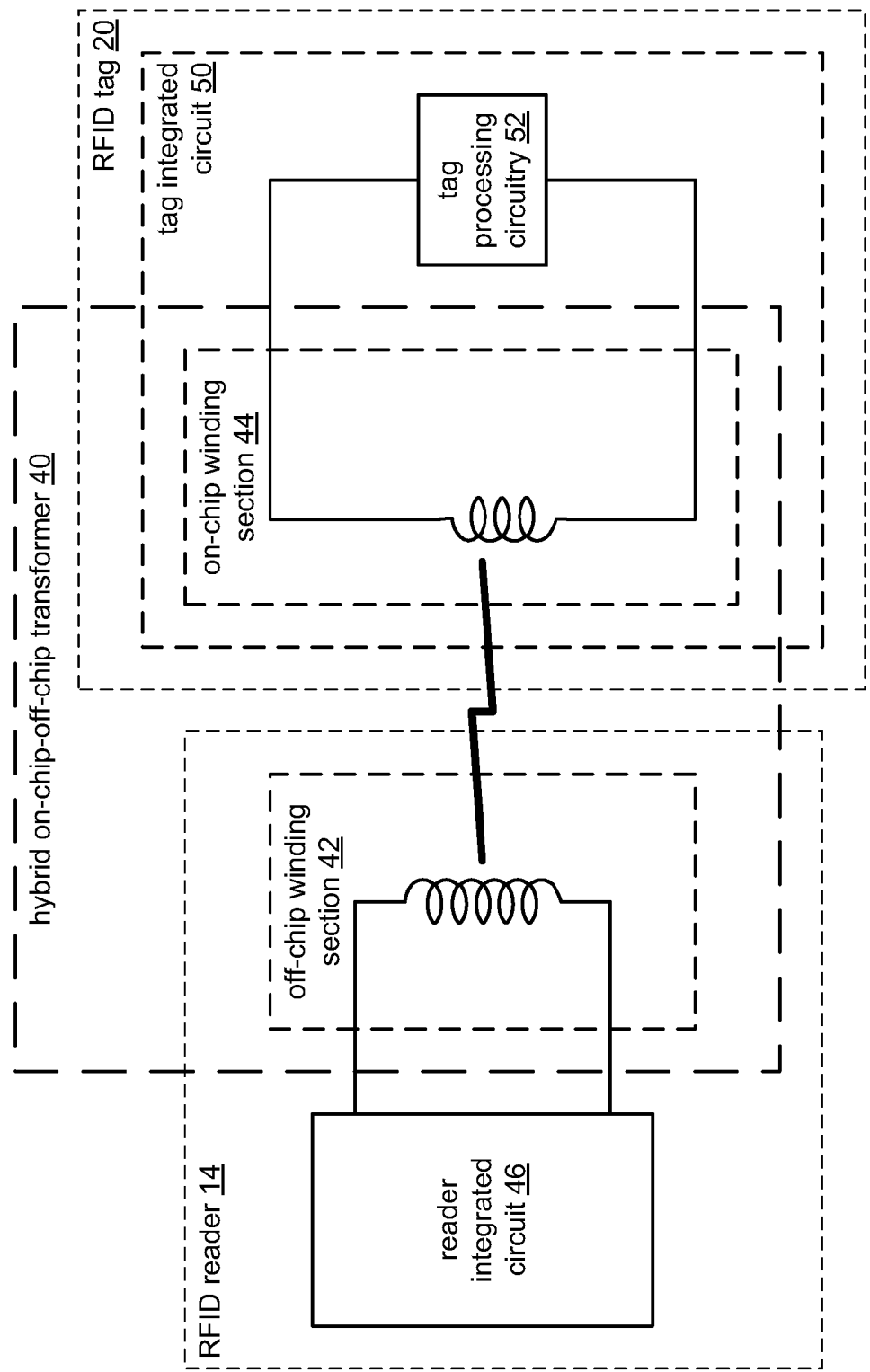
FIG. 2 is a schematic block diagram of an embodiment of a hybrid on-chip-off-chip transformer in accordance with the present invention.

FIG. 2 is a schematic block diagram of a hybrid on-chip-off-chip transformer 40 that includes an off-chip winding section 42 and an on-chip winding section 44. The off-chip winding section 42 may be included in an RFID reader 14 and the on-chip winding section 44 may be on a tag integrated circuit (IC) 50 of and RFID tag 20.

The off-chip winding section 42 is coupled to produce a first electromagnetic signal from a reference source, which may be an RFID reader integrated circuit 46. The on-chip winding section 44 is coupled to derive a second electromagnetic signal from the first electromagnetic signal when the on-chip winding section 44 is within a proximal coupling distance of the off-chip winding section 42.

In addition, the on-chip winding section 44 is coupled to produce the second electromagnetic signal from a second reference source, which may be tag processing circuitry 52 of the tag IC 50. The off-chip winding section 42 is coupled to derive the first electromagnetic signal from the second electromagnetic signal when the on-chip winding section 44 is within a proximal coupling distance of the off-chip winding section 42. Accordingly, the RFID tag 20 may communicate with the RFID reader 14 via the hybrid on-chip-off-chip transformer 40.

Figure 3:
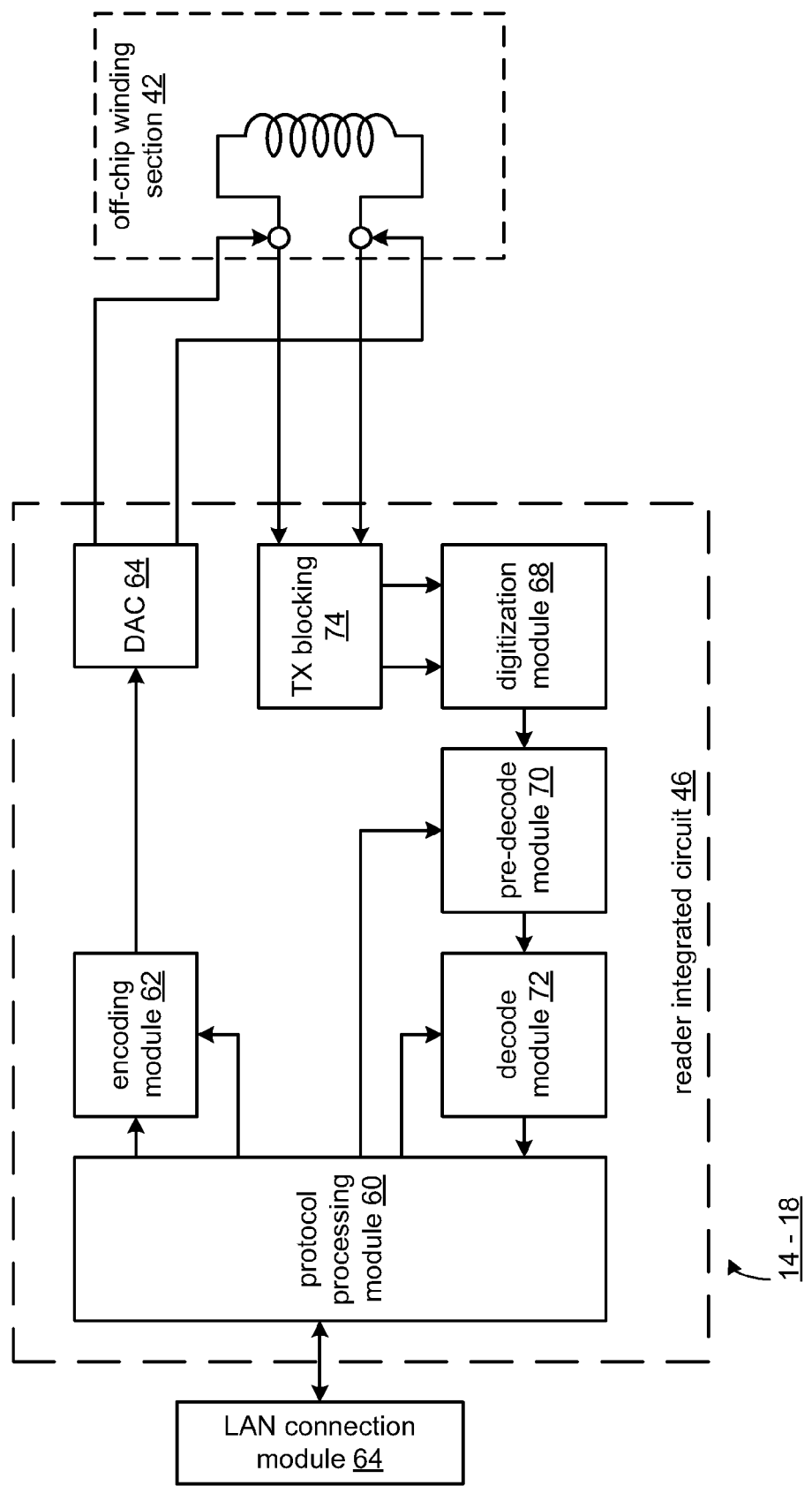
FIG. 3 is a schematic block diagram of an embodiment of an RFID reader in accordance with the present invention.

FIG. 3 is a schematic block diagram of an RFID reader 14-18 that includes an integrated circuit 46, the off-chip winding section 42, and may further include a local area network (LAN) connection module 64. The integrated circuit 46 includes protocol processing module 60, an encoding module 62, a digital-to-analog converter (DAC) 64, a transmit blocking circuit 74, a digitization module 68, and a decoding subsystem, which includes a pre-decode module 70 and a decode module 72. The local area network connection module 64 may include one or more of a wireless network interface (e.g., 802.11n.x, Bluetooth, et cetera) and/or a wired communication interface (e.g., Ethernet, fire wire, et cetera).

The protocol processing module 60 is coupled to prepare data for encoding via the encoding module 62 which may perform a data encoding in accordance with one or more RFID standardized protocols. The encoded data is provided to the digital-to-analog converter 64 which converts the digitally encoded data into an analog signal. The off-chip winding section 42 is coupled to receive the analog signal and to produce therefrom the first electromagnetic signal.

The transmit (TX) blocking circuit 74 blocks energy of the transmit signal such that it does not substantially interfere with the receiving of a response signal received from one or more RFID tags. For a received response signal, the digitization module 48, which may be a limiting module or an analog-to-digital converter, converts the received response signal into a digital signal. The pre-decode module 50 converts the digital signal into a biphase encoded signal or mixed signal in accordance with the particular RFID protocol being utilized. The biphase encoded or mixed signal is provided to the decoding module 52, which recaptures data therefrom in accordance with the particular encoding scheme of the selected RFID protocol. The protocol processing module 40 provides the recovered data to the server and/or computer via the local area network connection module 54. As one of ordinary skill in the art will appreciate, the RFID protocols (such as EPC class 0, EPC class 1, EPC Class 1 Gen 2, ISO 18000-6, etc.) utilize one or more of line encoding schemes such as Manchester encoding, FM0 encoding, FM1 encoding, four-interval bit cell encoding, etc.

Figure 4:
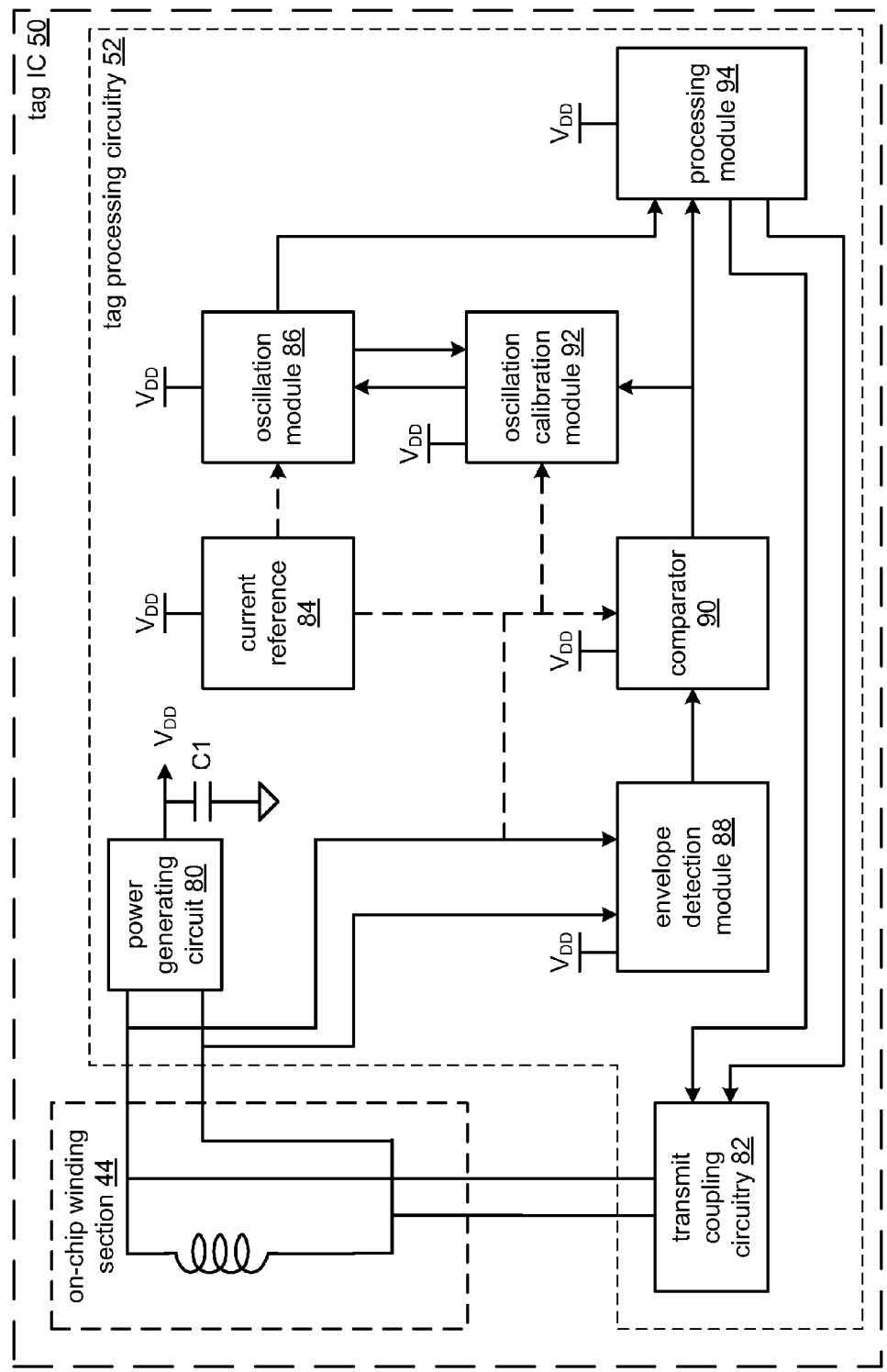
FIG. 4 is a schematic block diagram of an embodiment of an RFID tag in accordance with the present invention.

FIG. 4 is a schematic block diagram of the tag IC 50 of an RFID tag 20-30. The tag IC 50 includes the on-chip winding section 44 and the tag processing circuitry 52. The tag processing circuitry 52 includes a power generating circuit 80, a current reference 84, an oscillation module 86, a processing module 94, an oscillation calibration module 92, a comparator 90, an envelope detection module 88, and transmit coupling circuitry 82. The current reference 84, the oscillation module 86, the processing module 94, the oscillation calibration module 92, the comparator 90, and the envelope detection module 88 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, hard coded and/or operational instructions corresponding to at least some of the steps and/or functions illustrated in this FIG. 4.

In operation, the power generating circuit 80 generates a supply voltage ($V_{DD}$) from the signal provided by the on-chip winding section 44. For example, the on-chip winding section 44 receives an electromagnetic signal from the off-chip winding section 42, which produces a voltage across the terminals of the on-chip winding section 44. The power generating circuit 80 uses the voltage of the on-chip winding section 40 to produce the supply voltage $V_{DD}$, which is stored in capacitor C1.

When the supply voltage $V_{DD}$ is present, the envelope detection module 88 determines an envelope of the signal provided by the on-chip winding section 44, which may include a DC component corresponding to the supply voltage $V_{DD}$. In one embodiment, the signal provided by the on-chip winding section 44 is an amplitude modulation signal, where the envelope of the signal includes transmitted data. The envelope detection module 88 provides an envelope signal to the comparator 90. The comparator 90 compares the envelope signal with a threshold to produce a stream of recovered data.

The oscillation module 86, which may be a ring oscillator, crystal oscillator, or timing circuit, generates one or more clock signals that have a rate corresponding to the rate of the signal provided by the on-chip winding section 44 in accordance with an oscillation feedback signal. For instance, if the signal is a 20 MHz signal, the rate of the clock signals will be n*20 MHz, where "n" is equal to or greater than 1.

The oscillation calibration module 92 produces the oscillation feedback signal from a clock signal of the one or more clock signals and the stream of recovered data. In general, the oscillation calibration module 92 compares the rate of the clock signal with the rate of the stream of recovered data. Based on this comparison, the oscillation calibration module 92 generates the oscillation feedback to indicate to the oscillation module 86 to maintain the current rate, speed up the current rate, or slow down the current rate.

The processing module 94 receives the stream of recovered data and a clock signal of the one or more clock signals. The processing module 94 interprets the stream of recovered data to determine a command or commands contained therein. The command may be to store data, update data, reply with stored data, verify command compliance, acknowledgement, etc. If the command(s) requires a response, the processing module 94 provides a response signal to the transmit coupling circuitry 82 at a rate corresponding to the electromagnetic coupling between the on-chip winding section 44 and the off-chip winding section 42. The on-chip winding section 44 provides the response signal to the off-chip winding section 42 of the RFID reader 14.

The RFID tag 20-30 may further include the current reference 84 that provides one or more reference, or bias, currents to the oscillation module 86, the oscillation calibration module 92, the envelope detection module 88, and the comparator 90. The bias current may be adjusted to provide a desired level of biasing for each of the modules 86, 88, 90, and 92.

Figure 5:
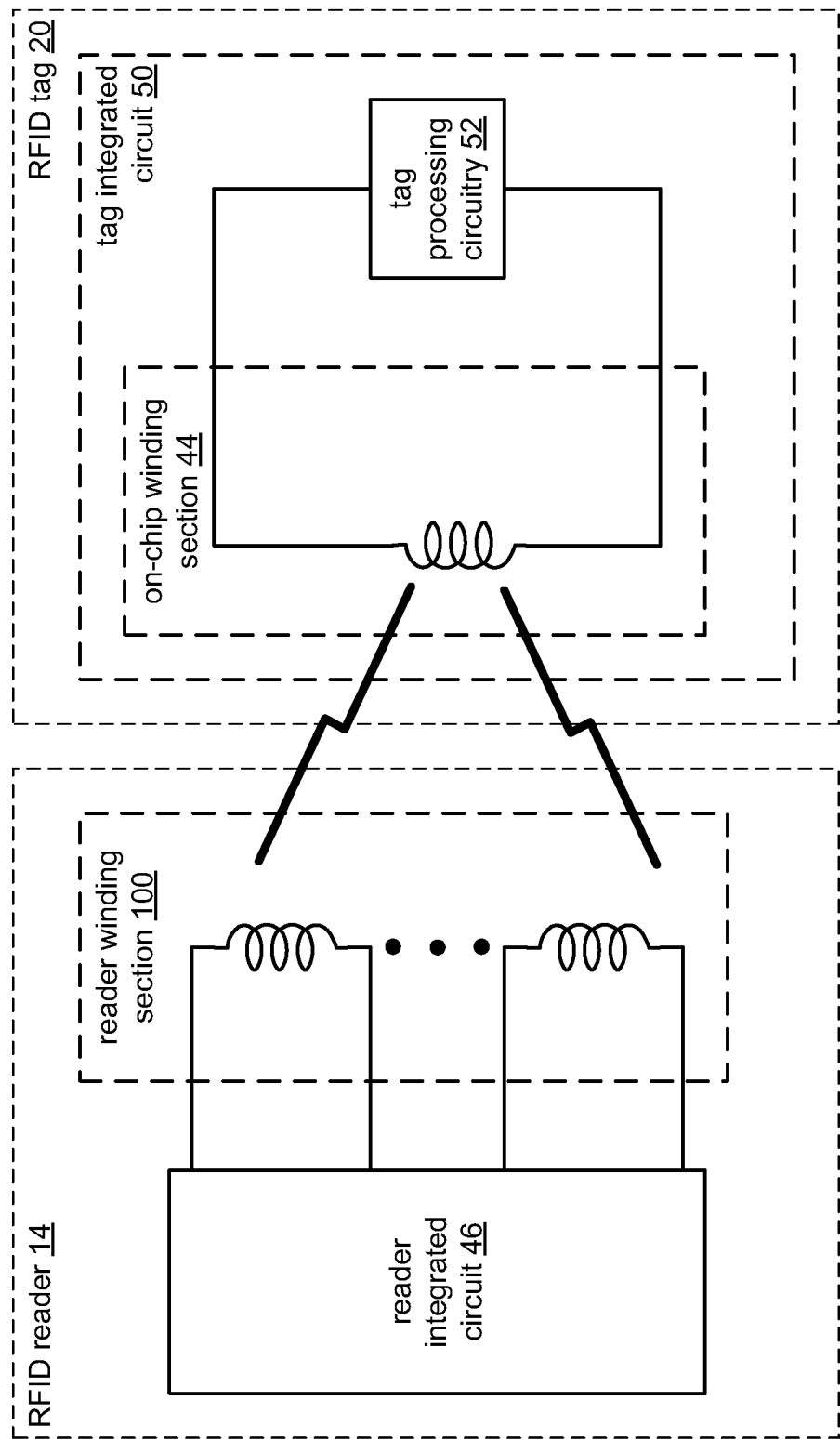
FIG. 5 is a schematic block diagram of an embodiment of an RFID reader and RFID tag in accordance with the present invention.

FIG. 5 is a schematic block diagram of an embodiment of an RFID reader 14 and an RFID tag 20. The RFID reader 14 includes the reader integrated circuit 46 and a reader winding section 100. The RFID tag 20 includes a tag integrated circuit 50 that includes tag processing circuitry 52 and an on-chip winding section 44. Note that the reader winding section 100 may be on the same chip as the reader integrated circuit 46, on a different chip, and/or on a board supporting the reader integrated circuit 46.

In this embodiment, the reader winding section 42 includes a plurality of coils to produce a plurality of electromagnetic fields from an encoded signal provided by the RFID reader integrated circuit 46. When the on-chip winding section 44 is proximal to the reader winding section 42 (e.g., within a centimeter), it generates a current and a recovered from at least one of the plurality of electromagnetic fields.

In addition, the on-chip winding section 44 is coupled to produce an outbound electromagnetic field from a signal provided by the tag processing circuitry 52 of the tag IC 50. The reader winding section 100 derives a recovered signal from the second electromagnetic signal when the on-chip winding section 44 is within a proximal coupling distance of the off-chip winding section 42. The reader integrated circuit 46 processes the recovered signal to produce inbound data.

The fully integrated RFID tag as previously described overcomes several issues. First, on chip integration of the tag's coil results in reduction of its quality factor, which is mainly due to high resistance of metal traces as well as loss of the substrate. The second problem arises in that the mutual inductance between the reader's and the tag's coils is proportional to the area of the tag's antenna. This affects values of the transimpedance and the modulation impedance.

The fully integrated RFID tag overcomes these issues by operating at high frequency ranges, which increases the quality factor and affects the mutual inductance by limiting the maximum radius of the reader's coil due to its self resonance frequency. In addition, the transimpedance and the modulation impedance of the system are functions of the operational frequency. Note that the mutual inductance of the system is increased by reducing the reader to tag distance.

Thus, by properly scaling system parameters, i.e. operational frequency and reader to tag distance, the tag's antenna or coil can be fully integrated. For instance, an approximation of the self-inductance of a circular conductor loop is given by [x], $$L \cong \mu_0 \cdot N^2 \cdot r_{av} \cdot \ln(2r_{av}/a)$$

where $r_{av}$ is the average radius of the loop and a is the difference of the outer radius and inner radius of the coil. As a rough approximation, the value of the inductor can be considered to be proportional to the radius of the loop. On the other hand, the parasitic series resistance of the inductor is proportional to the length of the conductor and is proportional to $r_{av}$ [x]. Therefore, the quality factor of the inductor can be written as:

$$Q = \frac{\omega_0 \cdot L}{r_{series}} \propto \omega_0$$

where $r_{series}$ is the series resistance of the inductor. As a result, by scaling up the operational frequency, the quality factor of the on-chip tag's coil is increased linearly.

In addition, the effect of increasing the operational frequency on the mutual inductance should be determined. For this, assume that the reader to tag distance is much higher than the radius of the reader's coil and that the maximum mutual inductance is achieved when the area of the reader's coil is maximized. As the radius of reader's coil increases, the values of the self-inductance of the coil as well as the parasitic capacitances are increased. The capacitance of the loop is proportional to the length of the conductor, which is proportional to the peripheral of the loop. The self-inductance of the coil is approximately proportional to the radius of the loop. Therefore, the self resonance frequency of the loop can be expressed as:

$$\omega_{self} = (L \cdot C_{par})^{-1/2} \propto r_{av}^{-1}$$

where L is the inductance, $C_{par}$ is the parasitic capacitance and $r_{av}$ is the average radius of the coil. Since the operational frequency of the circuit should be higher than the self resonant frequency, the maximum radius of the reader's coil happens when the self resonance is almost equal to the frequency of operation. Therefore, the relation between the maximum size of the reader's coil and the operational frequency is given by, $$r_{reader,max} \propto \frac{1}{\omega_0}.$$

Assuming $d \gg r_1 = r_{reader,max}$, the relation between the mutual inductance and the operational frequency can be found to be:

$$M_{12}(d) = \frac{\mu_0 \cdot N_1 \cdot N_2 \cdot r_{reader,max}^2 \cdot A_{Tag}}{2 \cdot d^3} \propto \omega_0^{-2} \cdot A_{Tag}$$

where $A_{Tag}$ is the area of the transponder's coil. As a result, the mutual inductance is scaled down by the square value of the frequency. From the above, it is assumed that the distance between the reader and the coil is constant while the frequency of the system is increased. However, the radius of the reader is scaled down by the frequency of operation and therefore, the ratio of distance to radius of the reader's coil is changed. A better comparison can be performed by expressing the mutual inductance $M_{12}$ as a function of the normalized distance which is defined as, $$d_{norm} = \frac{d}{r_{reader,max}}$$

For a fixed normalized distance $d_{norm}$, the actual reader to tag distance is scaled by a factor of $\omega_0^{-1}$, which yields:

$$M_{12}(d_{norm}) = \frac{\mu_0 \cdot N_1 \cdot N_2 \cdot A_{Tag}}{2 \cdot r_{reader,max} \cdot \sqrt{(1 + d_{norm}^2)^2}} \propto \omega_0 \cdot A_{Tag}$$

indicating that, for a fixed normalized distance, the mutual inductance linearly increases by increasing the frequency of operation.

For a fixed reader to tag distance, the effect of increasing the operational frequency on $Z_{12}$ can be expressed as:

$$Z_{12}(\omega_0)|_{d=d_0 \gg r_1} \propto A_{Tag},$$

which indicates that the transimpedance is proportional to the area of the transponder's coil. However, it is assumed that the radius of the reader's coil is scaled down by frequency of operation because its self resonance frequency. Expressing $M_{12}$ as a function of the normalized distance, the relation between the transimpedance and operation frequency, for a fixed normalized distance, is given by, $$Z_{12}(\omega_0)|_{d=d_{norm}} \propto \omega_0^3 \cdot A_{Tag}.$$

In addition, the relation between the modulation impedance $Z_{mod}$ and the frequency of operation can be expressed as, for a fixed actual distance and for a fixed normalized distance, respectively, as:

$$Z_{mod}(\omega_0)|_{d=d_0 \gg r_1} \propto \omega_0^{-1} \cdot A_{Tag}^2$$

$$Z_{mod}(\omega_0)|_{d=d_{norm}} \propto \omega_0^4 \cdot A_{Tag}^2$$

As calculated for the reader's coil, the maximum radius of the transponder's coil is also limited to its self-resonance frequency and is proportional to $\omega_0^{-1}$. Therefore, for a fixed reader to tag distance, it is concluded that $Z_{12}$ and $Z_{mod}$ are decreased by increasing the operational frequency by factor of $\omega_0^{-2}$ and $\omega_0^{-5}$ respectively. The sudden decrease of $Z_{12}$ and $Z_{mod}$ prevents any spying on the system, especially for the tag to reader communication.

In addition, for a fixed normalized distance, $Z_{12}$ and $Z_{mod}$ are increased by increasing the operational frequency. Assuming the RFID system requires $Z_{12}$ and $Z_{mod}$ to be higher than specific numbers, increasing the operational frequency enables the reduction of the area of the tag's coil at least by a factor of $\omega_0^{-2}$. In this case, the maximum reader to tag distance that can be covered by the system is also scaled down by a factor of $\omega_0^{-1}$.

Figure 6:
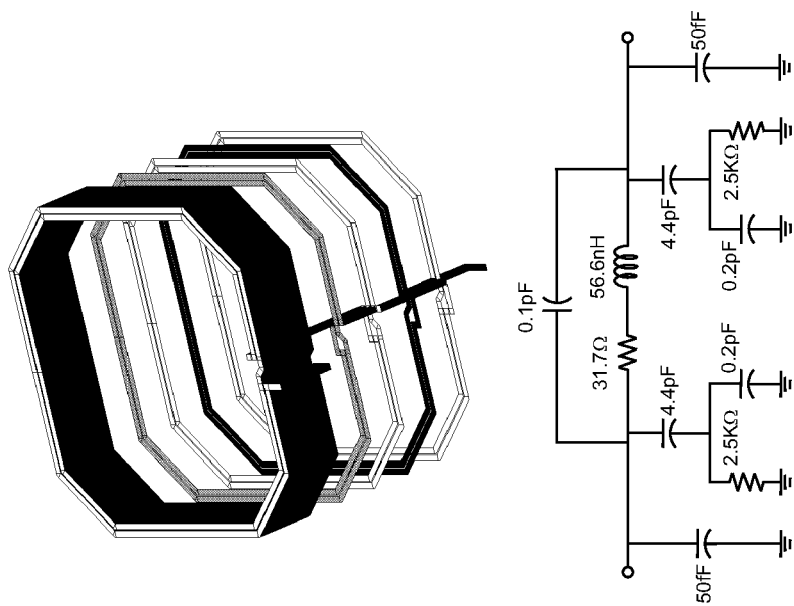
FIG. 6 is diagram of an embodiment of a coil of an RFID tag in accordance with the present invention.

FIG. 6 is diagram of an embodiment of a coil of an RFID tag that occupies an area of 550 µm×550 µm in 0.18 CMOS process. The tag coil consists of 5 inductors in series. Each inductor fabricated in one of metal layers 6 to 2 and contains two turns. To achieve the maximum sensitivity, the radius of the coil as well as its number of turns has to be as high as possible. The limiting factor, however, is the self resonance frequency of the inductor that should be higher than the frequency of operation. In addition, the quality factor of the on-chip coil drops by increasing its size mainly due to the ohmic loss of the metal traces as well as the loss of the substrate. The value of the designed inductor is 56.6 nH with the self-resonance frequency of slightly lower than 900 MHz which is the limit for the value of the inductor. The equivalent circuit of the inductor is also shown in FIG. 6. As shown, the tag's coil is designed as a single ended inductor. However, using differential inductor may increase the sensitivity of the circuit since it enables a higher inductance. In this case, the power recovery should be designed differentially to generate both negative and positive supply voltages.

The power amplifier of the RF front-end of the RFID reader includes a digital to RF configuration. In this structure, a tail current source is similar to a digital to analog converter that generates a current based on the digital inputs $[B_0 \ldots B_N]$ which is given by, $$I_B = I_{ref}(B_0 \times 2^0 + B_1 \times 2^1 + \ldots + B_{N-1} \times 2^{N-1}).$$

In the above equation, $I_{ref}$ is the reference current of the D/A converter. The current is up-converted to the frequency of operation by applying the output of the local frequency generator to transistors. For the reader to tag communication, the reader is required to modulate the current amplitude which induces a voltage over the transponder's coil due to the transimpedance $Z_{12}$. The modulation can be performed by using either reference current $I_{ref}$ or digital inputs $[B_0 \ldots B_N]$. In one embodiment, the tag to reader modulation is performed through the digital inputs of the tail current source. In an embodiment, the power amplifier employs 8-bits D/A structure with maximum bias current of 500 mA. Using 4 MSB bits as current control bits and 4 LSB bits to adjust the resolution, the current can be controlled in a range of 4× $20\log(2)=24$ dB with the resolution of $20\log(15/16)\approx 0.5$ dB.

In general, the bandwidth of the amplitude modulation data is much lower than the LO frequency and therefore, it can be considered constant in one switching period of the circuit. The switching behavior of the input transistors causes the voltage variation over the tail current source with twice the switching frequency. This generates even harmonics of $\omega_0$ in the bias current of the circuit due to finite output impedance of the tail current source. The bias current of the circuit can be expressed as:

$$I_B(t) = I_{B0} + \sum_{n=2,4,6,\ldots} I_n \sin(n\omega_0 t + n\theta_0),$$

where $\theta_0$ is the initial phase of the LO signal, $I_{B0}$ is the current generated proportional to the amplitude of the output signal and $I_n$'s are even harmonic terms of the bias current. In the rest of the paper, the initial phase of the LO, $\theta_0$, is assumed to be zero. The generated current is sampled at the frequency of $\omega_0$ by using switching transistors. Due to the symmetrical nature of the circuit, the current waveforms of two switching transistors are similar, with 180° phase difference. Therefore, the Fourier series of $i_{M1}(t)$ and $i_{M2}(t)$ can be expressed as, $$i_{M1}(t) = \frac{I_{B0}}{2} + \sum_{n=1}^{n=\infty} a_n \sin(n\omega_0 t)$$

$$i_{M2}(t) = \frac{I_{B0}}{2} + \sum_{n=1}^{n=\infty} a_n \sin(n\omega_0 t + n\pi)$$

These equations indicate that even harmonics are equal in both $i_{M1}(t)$ and $i_{M2}(t)$ while odd harmonics have opposite polarity with the same magnitude. By choosing proper device sizes, the current waveforms $i_{M1}(t)$ and $i_{M2}(t)$ are defined as the multiplication result of the bias current $I_B(t)$, and a square wave with 50% duty cycle. Therefore, the Fourier coefficients of $i_{M1}(t)$ and $i_{M2}(t)$ can be expressed as:

$$a_n = \begin{cases} \dfrac{I_n}{2} & n = 2, 4, 6, \ldots \text{ (even)} \\ \dfrac{2}{n\pi}I_{B0} + \sum_{|m\pm k|=n} \dfrac{I_m}{k\pi} & n = 1, 3, 5, \ldots \text{ (odd)} \end{cases}$$

where $i_n$'s are the amplitude of the even harmonic terms of the bias current. In a properly designed circuit, the even harmonics are small compare to the dc current so that $I_n/I_{B0} \ll 1$ (for $n=2,4,\ldots$). Therefore, the amplitude of the fundamental component of the current waveforms $i_{M1}(t)$ and $i_{M2}(t)$ can be approximated as $2I_{B0}/\pi$. The power amplifier delivers a high current to the reader's coil which provides for a strong magnetic field and increases the system's sensitivity. Due to the limited breakdown voltage of MOSFET devices, the impedance of the output network needs to be low to prevent high voltage swing at the output.

In order to obtain a low voltage swing at the output of the power amplifier, the output network is designed so that it introduces a low impedance load to the first and second harmonics of $\omega_0$. The higher harmonics of the current are assumed to be rejected by shunt LC networks, which also provide the bias current of the circuit. According to the above equations, the even harmonic terms of $i_{M1}(t)$ and $i_{M2}(t)$ are equal and their odd harmonic terms have the same magnitude with opposite polarity. As a result, the first harmonic components are applied to the output network as differential signal while the second harmonic terms are applied as common mode.

Since the first harmonic is applied differentially to the circuit, node A acts as a virtual ground at that frequency. On the other hand, the second harmonic is applied as a common mode signal and therefore, it doubles the effective impedance from node A to ground at each half circuit. As a result, the effective capacitance from node A to ground is divided by 2 in each half circuit of $2\omega_0$. To minimize the impedance at the output of the PA, the series combination of $L_1$ and $C_1$ should resonate at $\omega_0$ and the series combination of $L_1$, $C_1$ and $0.5C_2$ should resonate at $2\omega_0$. Therefore, $$\omega_0 = \frac{1}{\sqrt{L_1 \cdot C_1}},$$

$$2\omega_0 = \left(L_1 \cdot \frac{C_1 \cdot C_2}{2C_1 + C_2}\right)^{-\frac{1}{2}}.$$

Using these equations, the value of the tuning capacitors are defined as, $C_1=(\omega_0^2 L_1)^{-1}$ and $C_2=(2/3)\times C_1$. In another embodiment, the reader's coil may be fabricated on PCB board with the value of 30 nH and the Q of 55. The shape of the reader's coils is a 5 mm×5 mm square and it contains 4 turns. In this embodiment, the mutual inductance between the reader's and the tag's coils, for d=5mm, is roughly 0.2 nH. The reader's and tag's coils are approximated to be circular such that, for dc current of 500 mA that produces a 318 mA AC current in the reader's coil, the voltage swing at the tag's input is almost 0.3V. In an embodiment, the power recover circuit of the RFID tag converts this voltage into a 1V supply voltage having a load current of 10 μA.

In a near field RFID system, the maximum coupling between the reader and the transponder can be achieved when the tag's and the reader's coils are placed on top of each other. Misalignment of these two results in the sensitivity degradation of the system.

This becomes more critical when the operational frequency is increased which results in the smaller reader's coil and therefore a sharper magnetic field.

To increase the area in which the reader can detect a tag, the reader includes multiple coils, where each coil covers a portion of the total area. To drive multiple reader coils and avoid adjacent coils canceling each others electromagnetic field, adjacent coils should operate either at different frequency (e.g., frequency diversity) and/or at different time frames (e.g., time diversity). Any combination of these two methods is also possible as shown FIG. 7.

Figure 8:
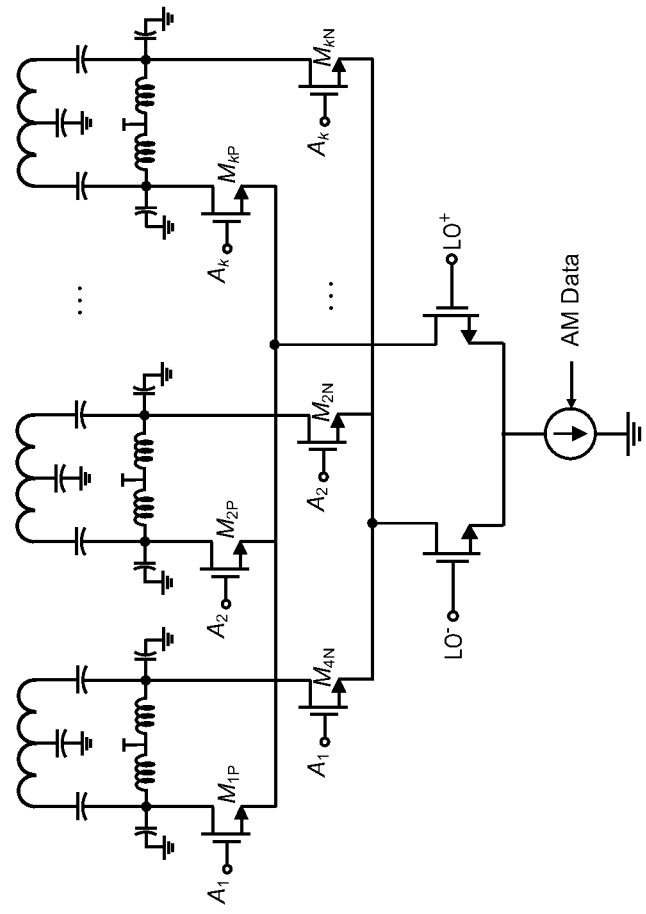
FIG. 8 is a schematic block diagram of an embodiment of a plurality of coils of an RFID reader in accordance with the present invention.
Figure 7:
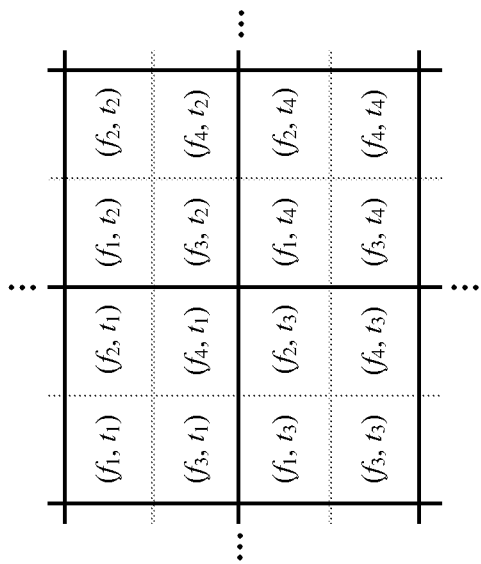
FIG. 7 is a diagram of frequency and/or time diversity schemes in accordance with the present invention.

As show in FIG. 7, the reader employs four different frequencies in order to prevent any flux cancellation due to adjacent coils. The system required four power amplifiers that each PA operates at one of the frequencies $f_1$ to $f_4$. However, the coils with the same operational frequency and different time frames can be driven by one power amplifier. For this purpose, the output current of the PA should be switched between different coils. FIG. 8 illustrates an embodiment of the power amplifier configured to turn on/off each coil by using cascode transistors.

In this embodiment, the current is directed to the $i^{th}$ coil by having $A_i$ equal to $V_{DD}$ and all other control bits equal to zero. By properly switching the PA's output, the reader can extend its coverage area.

Note that in the example of FIG. 7, the magnetic flux of the tag is may be up of a weighted summation of the magnetic field of all coils depending on the position of the tag relative to the reader. For the reader to tag communication, the coils operating simultaneously should have the same modulation pattern. As a result, the total magnetic flux would be modulated according to the reader to tag data. On the other hand, there is a mutual coupling between any two reader coils operating simultaneously. The mutual coupling could be directly through the air or through the tag's coil and may cause interference during the tag to reader communication.

To prevent this problem, the frequency separation between two frequencies assigned to two adjacent coils should be several times higher than the bandwidth of the data transmitted from the tag to reader.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An apparatus, comprising:
a first near field device including:
an encoding section for encoding data thereby generating encoded data;
a digital to analog conversion module for processing the encoded data thereby generating an analog encoded signal;
a plurality of coils for:
producing a first electromagnetic field in accordance with transmitting the analog encoded signal; and
producing a second electromagnetic field in accordance with receiving a response signal from a second near field device;
a response signal section for processing the response signal corresponding to the second electromagnetic field; and
a transmit blocking circuit for blocking energy of the first electromagnetic field associated with the analog encoded signal from interfering with the processing of the response signal.

2. The apparatus of claim 1, wherein:
the response signal section including a digitization module for processing the response signal thereby generating a digital signal; and
at least one of a pre-decode module and a decode module for processing the digital signal.

3. The apparatus of claim 1, further comprising:
a coil controller, coupled to the plurality of coils, for operating the plurality of coils in accordance with an electromagnetic field cancellation avoidance scheme.

4. The apparatus of claim 3, wherein the electromagnetic field cancellation avoidance scheme comprising at least one of:
frequency diversity; and
time diversity.

5. The apparatus of claim 1, wherein:
the plurality of coils being a plurality of traces on a plurality of layers of an integrated circuit.

6. The apparatus of claim 1, wherein the second near field device including:
a coil for producing at least one additional electromagnetic field in accordance with receiving a signal corresponding to the analog encoded signal or transmitting the response signal to the first near field device; and
system parameters for selectively operating the coil for a near field RFID communication and for a far field RFID communication.

7. The apparatus of claim 1, wherein:
the first near field device being one of a plurality of radio frequency identification (RFID) readers within an RFID system; and
the second near field device being one of a plurality of RFID tags within the RFID system.

8. The apparatus of claim 7, wherein:
the RFID system including a computer or server communicatively coupled to the plurality of RFID readers, for at least one of processing first data received from the plurality of RFID readers and providing second data to the plurality of RFID readers.

9. The apparatus of claim 1, wherein the first near field device including:
a protocol processing module for:
processing the response signal after having undergone processing by the response signal section; and
providing the data to the encoding section for encoding.

10. The apparatus of claim 1, wherein:
the first near field device being an radio frequency identification (RFID) reader; and
the second near field device being an RFID tag.

11. The apparatus of claim 1, wherein:
the first near field device being implemented using a first integrated circuit including the encoding section, the digital to analog conversion module, the response signal section, and the transmit blocking circuit;
the plurality of coils being implemented off-chip with respect to the first integrated circuit; and
the second near field device being implemented within a second integrated circuit.

12. An apparatus, comprising:
a first near field device including:
an encoding section for encoding data thereby generating encoded data;
a digital to analog conversion module for processing the encoded data thereby generating an analog encoded signal;
a plurality of coils for:
producing a first electromagnetic field in accordance with transmitting the analog encoded signal; and
producing a second electromagnetic field in accordance with receiving a response signal;
a response signal section for processing the response signal corresponding to the second electromagnetic field; and
a transmit blocking circuit for blocking energy of the first electromagnetic field associated with the analog encoded signal from interfering with the processing of the response signal; and
a second near field device including:
a coil for producing a third electromagnetic field in accordance with receiving the analog encoded signal and for providing a recovered signal there from;
a data processing section for processing the recovered signal thereby generating the response signal; and
wherein:
the coil producing a fourth electromagnetic field in accordance with transmitting the response signal to the first near field device.

13. The apparatus of claim 12, wherein the first near field device including:
a coil controller, coupled to the plurality of coils, for operating the plurality of coils in accordance with an electromagnetic field cancellation avoidance scheme.

14. The apparatus of claim 13, wherein the electromagnetic field cancellation avoidance scheme comprising at least one of:
frequency diversity; and
time diversity.

15. The apparatus of claim 12, wherein:
the first near field device being one of a plurality of radio frequency identification (RFID) readers within an RFID system; and
the second near field device being one of a plurality of RFID tags within the RFID system.

16. The apparatus of claim 15, wherein:
the RFID system including a computer or server communicatively coupled to the plurality of RFID readers, for at least one of processing first data received from the plurality of RFID readers and providing second data to the plurality of RFID readers.

17. A method for operating a near field device, the method comprising:
encoding data thereby generating encoded data;
processing the encoded data in accordance with digital to analog conversion thereby generating an analog encoded signal;
operating a plurality of coils for:
producing a first electromagnetic field in accordance with transmitting the analog encoded signal; and
producing a second electromagnetic field in accordance with receiving a response signal from at least one additional near field device;
processing the response signal corresponding to the second electromagnetic field; and
blocking energy of the first electromagnetic field associated with the analog encoded signal from interfering with the processing of the response signal.

18. The method of claim 17, further comprising:
operating the plurality of coils in accordance with an electromagnetic field cancellation avoidance scheme.

19. The method of claim 18, wherein the electromagnetic field cancellation avoidance scheme comprising at least one of:
frequency diversity; and
time diversity.

20. The method of claim 17, wherein:
the first near field device being an radio frequency identification (RFID) reader; and
the second near field device being an RFID tag.

* * * * *